(12) United States Patent
Azar et al.

(10) Patent No.: US 12,355,306 B2
(45) Date of Patent: Jul. 8, 2025

(54) ROTOR BODY FOR A PERMANENT MAGNET MACHINE

(71) Applicant: Siemens Gamesa Renewable Energy A/S, Brande (DK)

(72) Inventors: Ziad Azar, Sheffield (GB); Balazs Janos Becs, Flensburg (DE); Vikas Choudhary, Bangalore (IN); Edom Demissie, Sheffield (GB); Erik Groendahl, Them (DK); Bo Nedergaard Jacobsen, Odder (DK); Adriana Cristina Urda, Mill Creek, WA (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/274,112

(22) PCT Filed: Nov. 25, 2021

(86) PCT No.: PCT/EP2021/083001
§ 371 (c)(1),
(2) Date: Jul. 25, 2023

(87) PCT Pub. No.: WO2022/167117
PCT Pub. Date: Aug. 11, 2022

(65) Prior Publication Data
US 2024/0429762 A1    Dec. 26, 2024

(30) Foreign Application Priority Data

Feb. 2, 2021 (EP) .................................... 21154711

(51) Int. Cl.
*H02K 1/2791* (2022.01)
*F03D 9/25* (2016.01)
(Continued)

(52) U.S. Cl.
CPC ............. *H02K 1/2791* (2022.01); *F03D 9/25* (2016.05); *H02K 7/102* (2013.01); *H02K 7/1838* (2013.01);
(Continued)

(58) Field of Classification Search
CPC .... H02K 1/2791; H02K 7/102; H02K 7/1838; H02K 15/03; H02K 21/22; F03D 9/25
See application file for complete search history.

(56) References Cited

U.S. PATENT DOCUMENTS 5,176,946 A * 1/1993 Wieloch ................ H01F 27/263
428/137
5,886,441 A * 3/1999 Uchida ................ H02K 1/2773
310/264

(Continued)

FOREIGN PATENT DOCUMENTS

DE   10 2016 105114 A1   10/2016
EP      2 169 220 A2     3/2010
(Continued)

OTHER PUBLICATIONS

International Search Report & Written Opinion for PCT/EP2021/083001 issued on Jan. 10, 2022.

*Primary Examiner* — Pedro J Cuevas
(74) *Attorney, Agent, or Firm* — Schmeiser, Olsen & Watts LLP

(57) ABSTRACT

A rotor for an electrical machine extends along a longitudinal axis between a drive end and an axially opposite non-drive end, the drive end being attachable to a torque input. The rotor includes: a rotor body extending axially between the drive end and the non-drive and extending in a radial direction orthogonal to the longitudinal axis between an inner side and an outer side, plurality of permanent magnets attached to the inner side a circumferentially dis-
(Continued)

tributed about the longitudinal axis, wherein the rotor body includes a plurality of lamination sheets stacked along the longitudinal axis.

13 Claims, 4 Drawing Sheets

(51) Int. Cl.
    H02K 7/102     (2006.01)
    H02K 7/18      (2006.01)
    H02K 15/03     (2025.01)
    H02K 21/22     (2006.01)
(52) U.S. Cl.
    CPC ............ H02K 15/03 (2013.01); H02K 21/22 (2013.01); *F05B 2220/706* (2013.01)

(56) References Cited

U.S. PATENT DOCUMENTS

| | | | | |
|---|---|---|---|---|
| 6,002,186 A * | 12/1999 | Coutu | ................. | H02K 7/06 310/49.18 |
| 6,772,503 B1 | 8/2004 | Fathimulla et al. | | |
| 7,919,898 B2 * | 4/2011 | Wang | ................. | H02K 1/276 310/216.127 |
| 8,823,234 B2 * | 9/2014 | Ortt | ................. | H02K 1/17 310/154.29 |
| 9,935,506 B2 * | 4/2018 | Semken | ................. | H02K 1/185 |
| 10,396,615 B2 * | 8/2019 | Galioto | ................. | H02K 3/493 |
| 10,541,573 B2 * | 1/2020 | Semken | ................. | H02K 15/125 |
| 12,126,219 B2 * | 10/2024 | Martin | ................. | H02K 1/276 |
| 2004/0004407 A1 * | 1/2004 | Laurent | ................. | H02K 1/2773 310/156.48 |
| 2008/0048517 A1 * | 2/2008 | Ochiai | ................. | H02K 1/278 310/216.004 |
| 2008/0211236 A1 | 9/2008 | Appa et al. | | |
| 2009/0200884 A1 | 8/2009 | Lafontaine | | |
| 2009/0267438 A1 * | 10/2009 | Murakami | ............. | H02K 1/278 310/156.28 |
| 2010/0033036 A1 * | 2/2010 | Ortt | ................. | H02K 1/2791 310/156.38 |
| 2011/0074242 A1 * | 3/2011 | Singhal | ................. | H02K 7/16 29/598 |
| 2011/0080068 A1 | 4/2011 | Dawson et al. | | |
| 2011/0278966 A1 * | 11/2011 | Osborne | ................. | H02K 1/17 310/44 |
| 2011/0298313 A1 * | 12/2011 | Osborne | ................. | H02K 1/17 310/50 |
| 2015/0194848 A1 * | 7/2015 | Osborne | ................. | H02K 1/185 310/154.08 |
| 2015/0222151 A1 * | 8/2015 | Semken | ................. | H02K 1/18 29/452 |
| 2016/0294262 A1 | 10/2016 | Yomoda et al. | | |
| 2018/0212481 A1 * | 7/2018 | Semken | ................. | H02K 1/185 |
| 2023/0062483 A1 * | 3/2023 | Ledieu | ................. | H02K 21/14 |
| 2023/0113826 A1 * | 4/2023 | Ledieu | ................. | H02K 11/21 310/68 C |
| 2023/0369920 A1 * | 11/2023 | Mao | ................. | H02K 1/12 |
| 2024/0030783 A1 * | 1/2024 | Ledieu | ................. | H02K 7/083 |

FOREIGN PATENT DOCUMENTS

| | | |
|---|---|---|
| EP | 2 713 480 A1 | 4/2014 |
| EP | 2597752 A3 | 8/2017 |
| WO | 2011/039143 A2 | 4/2011 |

* cited by examiner

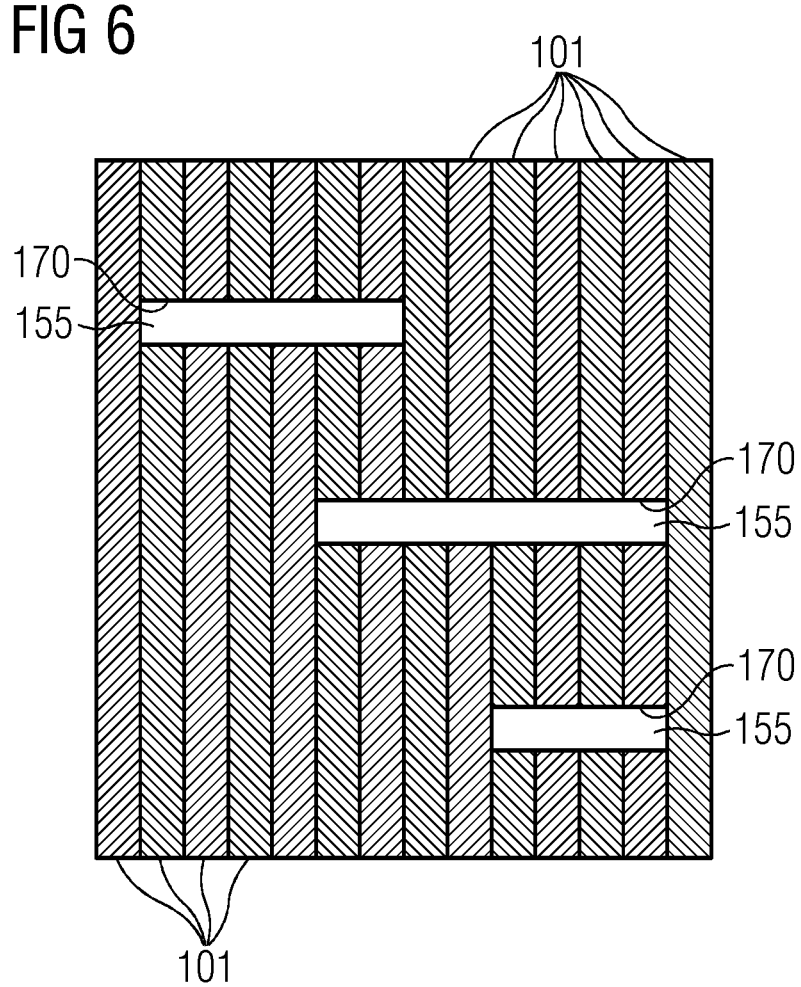

ROTOR BODY FOR A PERMANENT MAGNET MACHINE

CROSS-REFERENCE TO RELATED APPLICATIONS

This application claims priority to PCT Application No. PCT/EP2021/083001, having a filing date of Nov. 25, 2021, which claims priority to European Application No. 21154711.2, having a filing date of Feb. 2, 2021, the entire contents both of which are hereby incorporated by reference.

FIELD OF TECHNOLOGY

The following relates to the field of permanent magnet electrical machines. Particularly, but not exclusively, the following relates to permanent magnet electrical generators for direct drive wind turbines.

BACKGROUND

A permanent magnet electric machine, such as an electric generator installed in a wind turbine, typically comprises a rotor which rotates about a stator around a central rotational axis. Stator and rotor are separated from each other by an airgap, circumferentially extended around the rotational axis. In a direct drive wind turbine, a permanent magnet electric generator is used, which has the generator rotor directly attached to the wind rotor.

In the above defined technical field, it is known to build an electric generator having a rotor body usually made of sheet metal by welding on both the inside and outside through the complete longitudinal length. Pockets are afterwards milled on the inside of the generator rotor house for the placement of permanent magnets.

This manufacturing process based on a welding process is becoming more and more challenging and expensive by the permanently increasing size of Wind Turbine Generators.

Additionally, the rotor body is made of steel, and this leads to eddy current losses and heat generation during operation, especially in case of electrical generators including a fractional slot concentrated winding. This generated thermal energy increases the temperatures of the permanent magnets. The temperature increase reduces the generated flux density and hence the performance of the generator. Further, higher permanent magnet operating temperatures increase the required heavy rare earth metal content (and hence the price) of the permanent magnets.

It is therefore desirable to provide efficient and cost-effective constructional features of a rotor body for a permanent magnet machine for avoiding the above-mentioned inconveniences.

SUMMARY

An aspect relates to a rotor for an electrical machine is provided. The rotor extends along a longitudinal axis between a drive end and an axially opposite non-drive end. The drive end is attachable to a torque input. The rotor comprises:
a rotor body extending axially between the drive end and the non-drive end and extending in a radial direction orthogonal to the longitudinal axis between an inner side and an outer side,
plurality of permanent magnets attached to the inner side a circumferentially distributed about the longitudinal axis,
wherein the rotor body includes a plurality of lamination sheets stacked along the longitudinal axis.

According to a further aspect of embodiments of the present invention, a method of manufacturing is provided for manufacturing a rotor for an electrical machine. The rotor extends along a longitudinal axis between a drive end and an axially opposite non-drive end, the drive end being attachable to a torque input. The method comprises the steps of:
manufacturing a plurality of permanent magnets,
manufacturing a plurality of lamination sheets, each lamination sheet having a lamination inner border and a lamination outer border,
stacking the plurality of lamination sheets along the longitudinal axis for forming a rotor body extending axially between the drive end and the non-drive end and extending in a radial direction orthogonal to the longitudinal axis between an inner side and an outer side, the stacked lamination inner borders forming the inner side and the stacked lamination outer borders forming the outer side,
attaching the permanent magnets to the inner side of the rotor body.

The above-described rotor may be implemented in an electric generator installed in a wind turbine, in particular in a direct drive wind turbine.

The laminations structure of the rotor body according to embodiments of the invention allow eliminating expensive machining processes on the inner side (for example for the placement of the permanent magnets) and/or on the outer side of the rotor body. Features may be provided on the lamination sheets which after the stacking provides the features which are required on the rotor. For example, according to possible embodiments of the present invention, the rotor body may include a plurality of tensioning bolts for applying a compression to the plurality of lamination sheets along the longitudinal axis, the tensioning bolts being inserted in respective tensioning holes, each bolt and hole extending axial between the drive end and the non-drive end. In such embodiments, holes may be provided on the lamination sheets, which after the stacking form the tensioning holes.

Using a laminated structure substantially reduce the eddy current losses in the rotor body in operation leading to a reduction in production losses, a reduction in the permanent magnet operating temperature and an increase in the flux density.

According to embodiments of the present invention, the tensioning bolts and holes are provided on the outer side of the rotor body. The outer side of the rotor body comprises a plurality of radial protrusions axially extending between the drive end and the non-drive end, each of tensioning holes being at least partially housed in one of the radial protrusions. This may lead to an improved cooling on the outer side, this further reducing the permanent magnet operating temperature. Reduce temperatures of the rotor may also reduce air gap variation due to thermal expansion. Reducing the permanent magnet operation temperature could lead to a reduction of the heavy rare earth metal content of the permanent magnets.

According to further embodiments of the present invention, the inner side may include a plurality of attaching means for attaching the plurality of permanent magnets to the rotor body. This attaching means may include seats for permanent magnet modules. Alternatively, the inner side may include a plurality of axial cavity extending between the drive end and the non-drive end for housing the plurality of permanent magnets. This allows a direct assembly of the permanent magnets to the laminated rotor body, without using baseplates. This can eliminate the baseplate losses leading to a further reduction of the overall losses.

According to other embodiments of the present invention, a plurality of insulations layers is interposed between the plurality of lamination sheets. This could further reduce the eddy current losses in the rotor body, thus further reducing the heat generation.

A coating may further be provided at least over one of the inner side and outer side. This would seal potential leakages.

BRIEF DESCRIPTION

Some of the embodiments will be described in detail, with reference to the following figures, wherein like designations denote like members, wherein:

FIG. 6 shows a partial sectional view of the rotor body of FIG. 3, showing further features according to embodiments of the present invention.

DETAILED DESCRIPTION

Figure 1:
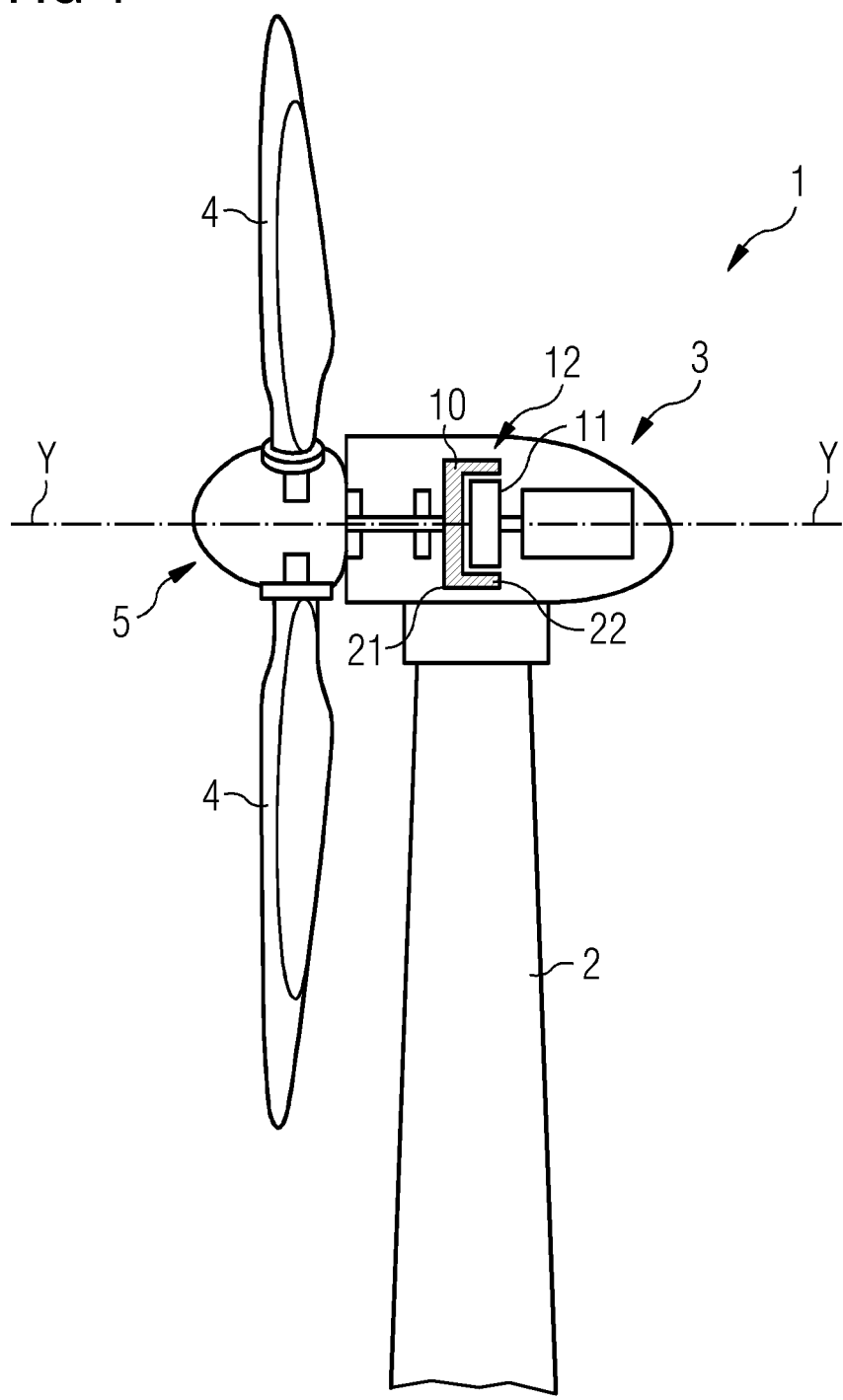
FIG. 1 shows a schematic section of a wind turbine including a rotor according to embodiments of the present invention.

FIG. 1 shows a partial cross-sectional view of a wind turbine 1 including a permanent magnet machine 12, i.e., an electrical generator, which includes a rotor 10 according to embodiments of the invention. The wind turbine 1 comprises a tower 2, which is mounted on a non-depicted foundation. A nacelle 3 is arranged on top of the tower 2. The wind turbine 1 further comprises at least a wind rotor 5 having a hub and at least one blade 4 (in the embodiment of FIG. 1, the wind rotor comprises three blades 4, of which only two blades 4 are visible). The wind rotor 5 is rotatable around a rotational axis Y. The terms axial, radial and circumferential in the following are to be intended with reference to the longitudinal axis Y of rotation of the permanent magnet machine 10. The blades 4 extend substantially radially with respect to the rotational axis Y. The permanent magnet machine 12 extends longitudinally between a drive end 21 connected to the wind rotor 5 and an opposite non-drive end 22. The torque input from the wind rotor 5 is transmitted to the electrical generator at the drive end 21. The permanent magnet machine 12 includes a stator 11 and a rotor 10. The rotor 10 is rotatable with respect to the stator 11 about the rotational axis Y. In the embodiment of FIG. 1, the rotor 10 is radially external with respect the stator 11 and rotatable about the longitudinal axis Y. A circumferential air gap is provided between the stator 11 and the rotor 10.

The wind rotor 5 may be rotationally coupled with the drive end 21 of the rotor 10 directly (direct drive generator). Alternatively, according to other embodiments of the present invention, the wind rotor 5 is rotationally coupled with the rotor 10 by a rotatable main shaft and/or through a gear box.

Figure 2:
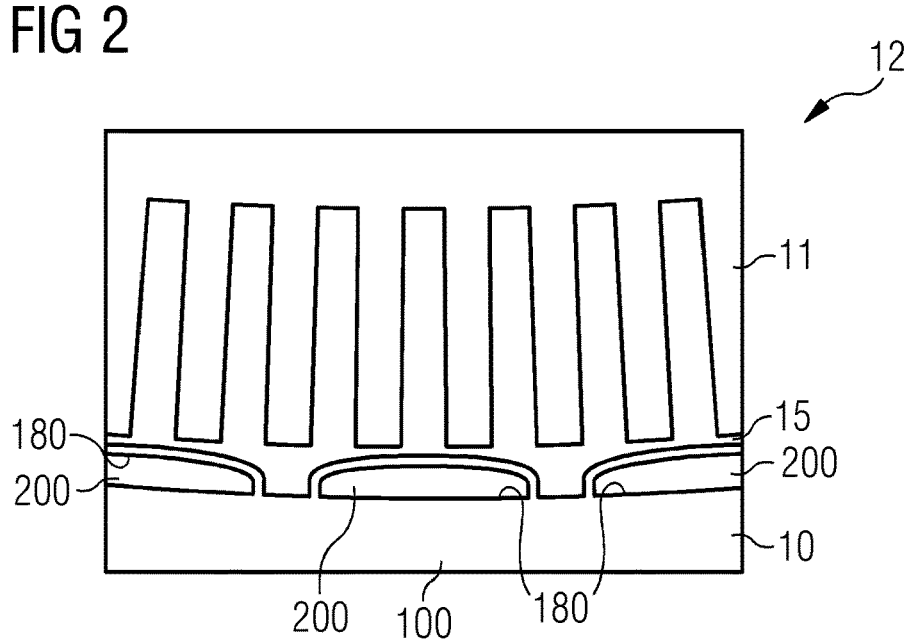
FIG. 2 shows a cross-sectional view of a permanent magnet machine including a rotor according to embodiments of the present invention.
Figure 3:
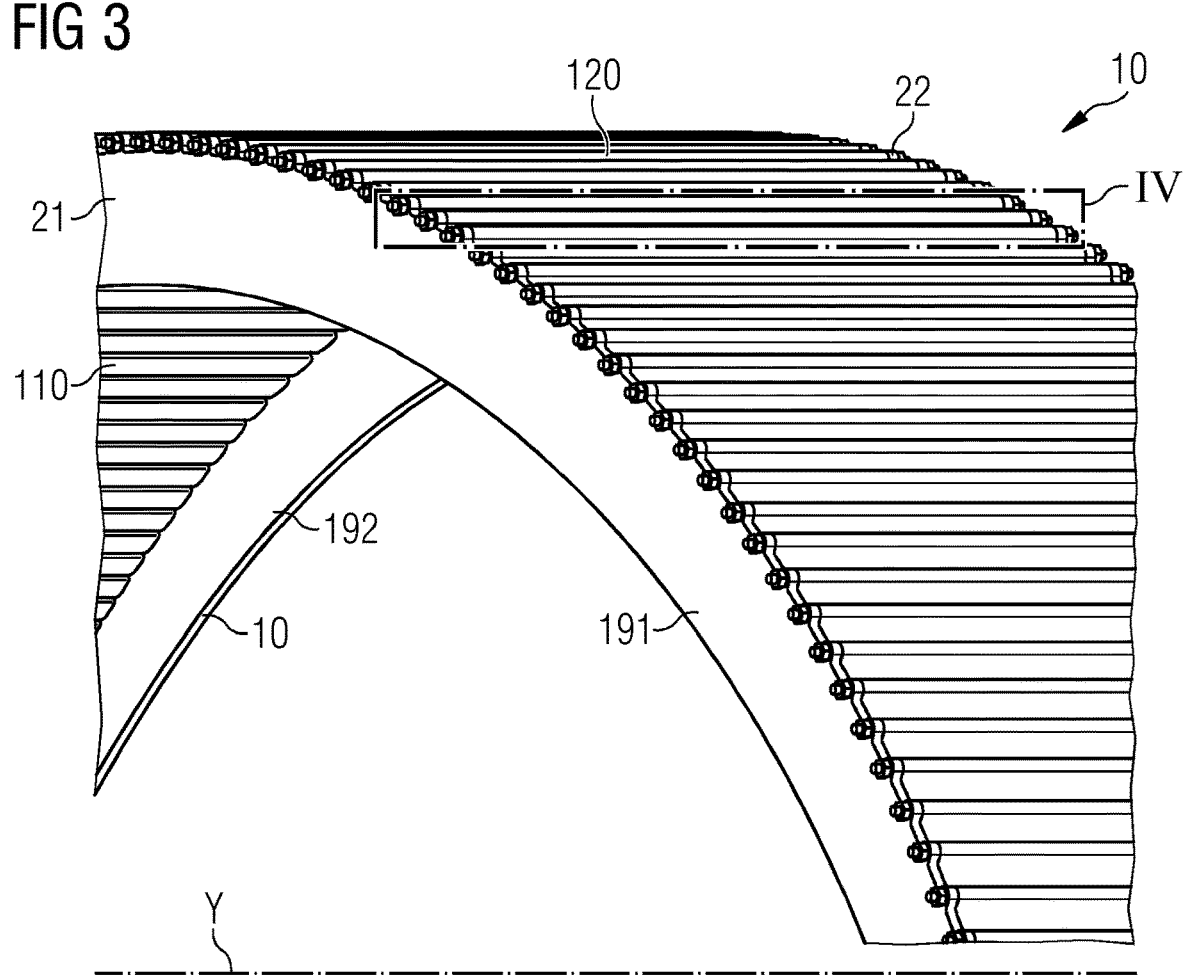
FIG. 3 shows an axonometric view of the rotor body of the permanent magnet machine of FIG. 2.
Figure 4:
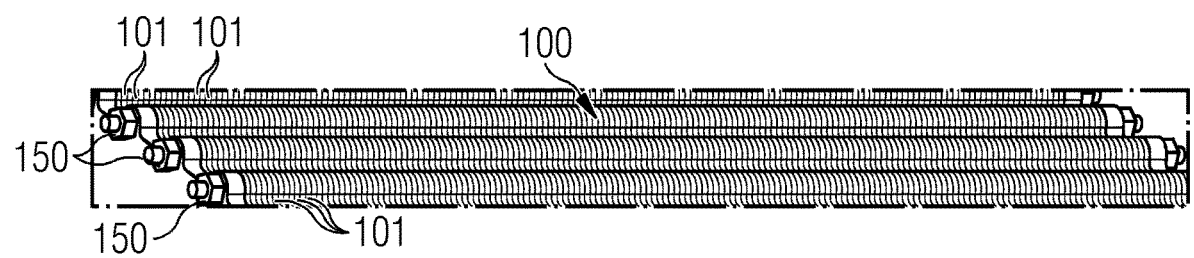
FIG. 4 shows a magnified view of the detail IV of FIG. 3.

FIG. 2 shows a partial cross-sectional view of the permanent magnet machine 12 including a plurality of permanent magnets 200 attached to the rotor 10. The permanent magnets 200 are attached to a side of the rotor 12 which radially faces the stator 11 at an air gap 15. Each of the permanent magnets 200 is attached to a rotor body 100 of the rotor 10 by a respective axial cavity 180 extending between the drive end 21 and the non-drive end 22, as better clarified in the following. According to other embodiments of the present invention (not shown), each of the permanent magnets 200 is attached to the rotor body 100 of the rotor 10 by the respective support or baseplate.

Figure 5:
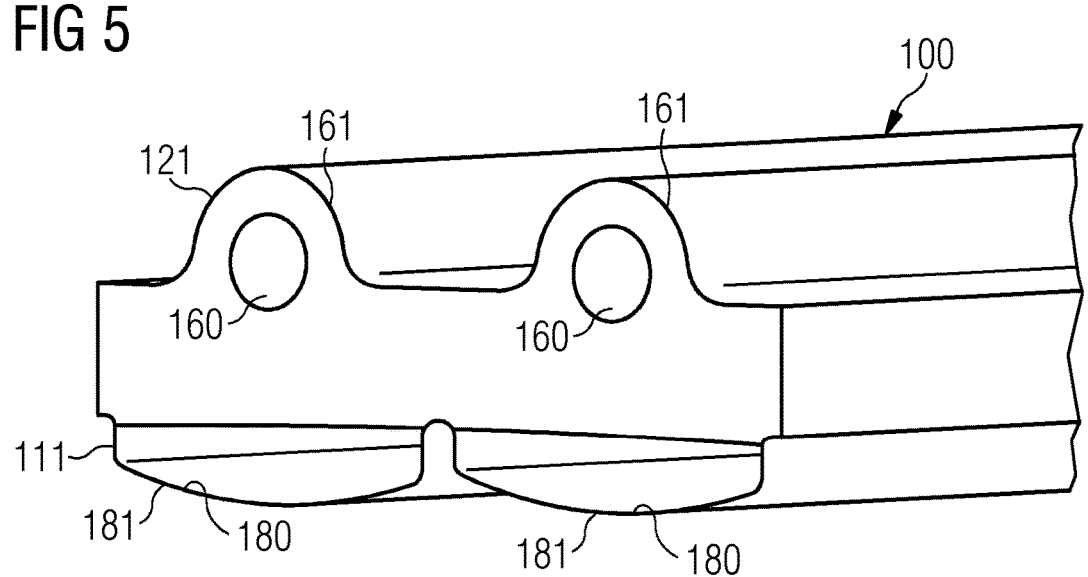
FIG. 5 shows a partial axonometric view of the rotor body of FIG. 3, showing further features according to embodiments of the present invention.

FIGS. 3 to 6 illustrate an embodiment of a rotor according to the present invention. The rotor 10 extends along the longitudinal axis Y between the drive end 21 and the axially opposite non-drive end 22. The rotor 10 comprises a rotor body 100 extending axially between the drive end 21 and the non-drive 22 and extending in a radial direction orthogonal to the longitudinal axis Y between an inner side 110 and an outer side 120. A coating may be provided over one or both the inner side 110 and the outer side 120. Two annular plates 191, 192 are respectively provided at the drive end 21 and at the non-drive end 22. The first annular plate 191 attached at the drive end 21 is normally referred to as front plate. The second annular plate 192 attached at the non-drive end 22 is a brake disc, which may be used for applying a braking torque to the rotating rotor 10. The rotor body 100 includes a plurality of lamination sheets 101 stacked along the longitudinal axis Y, between the drive end 21 and the non-drive-end 22. The stack of lamination sheets 101 therefore axially extend from one to the other of the two annular plates 191, 192. Insulations layers may be interposed between the plurality of lamination sheets 101, in such a way that in the stack of lamination sheets 101 each lamination sheet 101 is axially interposed between two insulation layers. The lamination sheets 101 may be assembled by applying a staggering. Each of the lamination sheets 101 has a lamination inner border 111 and a lamination outer border 121. The plurality of stacks lamination inner borders 111 forms after the stacking of the lamination sheets 101 the inner side 110 of the rotor body 100. The plurality of stacks lamination outer borders 121 forms after the stacking of the lamination sheets 101 the outer side 120 of the rotor body 100. The rotor 10 further comprises a plurality of permanent magnets 200 attached to the inner side 100 a circumferentially distributed about the longitudinal axis Y. The inner side 110 includes a plurality of attaching means for attaching the plurality of permanent magnets 200 to the rotor body 100. In embodiments of the present invention (not shown), permanent magnets are incorporated in permanent magnet modules, each permanent magnet module including at least one permanent magnet and at least one baseplate to which the permeant magnet is attached, and which is used for attaching the permanent magnet module to the inner side 110 of the rotor body 100. In other to provide the coupling between the rotor body 100 and the permanent magnet module, the inner side 110 may include a plurality of attaching means for attaching the permanent magnet modules to the inner side 110. The attaching means may be in the form of axial extended cavities for housing respective protrusions provided on the baseplate. Cavities and protrusions may have a dovetail sectional shape. According to the embodiment shown in the attached figures (in particular. FIGS. 2 and 5), a plurality of axial cavity 180 may be provided at the inner side 110, the axial cavities 180 extending between the drive end 21 and the non-drive end 22 for housing a plurality of permanent magnets 200, without using a baseplate. The plurality of permanent magnets 200 are inserted and housed in such cavity radially protruding towards the air gap 15. Each cavity is obtained providing a cover 181 attached to the inner side 110 of the rotor body 100, the cavity 180 having the same cross-sectional shape of the magnet. The cover 181 may be integral with rotor body 100. According to other embodiments of the present invention, the cover 181 may be assembled onto the inner side 110 of the rotor body 100 to create. The rotor body 100 may include a plurality of tensioning bolts 150 for applying a compression to the plurality of lamination sheets 101 along the longitudinal axis Y. Alternatively or additionally, the plurality of lamination sheets 101 may be welded together under axial pressure. After the plurality of lamination sheets 101 are stacked and compressed along the longitudinal axis Y, one or more welding may be applied to the lamination sheets 101, in order to keep them under axial compression. The axial compression provided through the tensioning bolts 150 and/or the welding permits to conveniently transmit the torque input to the stack of lamination sheets 101 comprised in the rotor body 110. The tensioning bolts 150 are inserted in respective tensioning holes 160, each bolt 150 and hole 160 extending axial between the drive end 21 and the non-drive end 22. The tensioning holes 160 may extend also through the two annular plates 191, 192 so that they may be fixed to the plurality of stacked lamination sheets 101 by the plurality of tensioning bolts 150. According to the embodiment shown in the attached figures, the tensioning bolts 150 and holes 160 are provided on the outer side 120 of the rotor body 100. According to other embodiments (not shown) the tensioning bolts 150 and holes 160 may be provided on another position between the inner side 110 and the outer side 120. The outer side 120 of the rotor body 100 may comprise a plurality of radial protrusions 161 axially extending between the drive end 21 and the non-drive end 22, each of tensioning holes 160 being at least partially housed in one of the radial protrusions 161.

As shown in FIG. 6, another plurality of axial holes 170 may be alternatively or additionally provided, which extend across two or more lamination sheets 101. Such holes are used for housing respective strengthening pins 155 for preventing circumferential relative rotation between the lamination sheets 101. The strengthening pins 155 may be pressed inside the axial holes 170 with a small interference, in order to prevent circumferential relative rotation between the lamination sheets 101 on which they are active. Each pin 155 may extend axially along all the stacked lamination sheets 101. Alternatively, each pin 155 may extend axially along a portion of the stacked lamination sheets 101 and abut axially between two lamination sheets 101 not having any hole aligned with such pin 155, thus preventing axial relative movements between the pin 155 and the lamination sheets 101. In the exemplary embodiment shown in FIG. 6, three pins 155 are shown, two of which extend axially across 8 lamination sheets and a one across 4 lamination sheets. According to other embodiments (not shown) any other number of pins 155 may be used, each extending across two or more lamination sheets 101.

According to other embodiments (not shown), the rotor body 100 may include other types of axial strengthening elements for preventing circumferential relative rotation between the lamination sheets 101. The axial strengthening elements 101 may be inserted in respective axial holes extending across two or more lamination sheets of the plurality of lamination sheets 101.

The features of the rotor body 100 may be provided on each of the lamination sheets 101, so that after the stacking process such features are obtained on the rotor. Holes and covers be provided on the lamination sheets 101, which after the stacking form the tensioning holes 160 and the covers 181, respectively.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor for an electrical machine extending along a longitudinal axis between a drive end and an axially opposite non-drive end, the drive end being attachable to a torque input, the rotor comprising:
 a rotor body extending axially between the drive end and the non-drive and extending radially orthogonal to the longitudinal axis between an inner side and an outer side; and
 a plurality of permanent magnets attached to the inner side circumferentially distributed about the longitudinal axis
 wherein the rotor body includes a plurality of lamination sheets stacked along the longitudinal axis;
 wherein the rotor body includes a plurality of axial strengthening elements inserted in respective axial holes extending across two or more lamination sheets of the plurality of lamination sheets;
 wherein the axial strengthening elements further comprise pins inserted in respective pin holes, each pin and pin hole extending across two or more lamination sheets of the plurality of lamination sheets.

2. The rotor according to claim 1, wherein the axial strengthening elements comprises tensioning bolts for applying a compression to the plurality of lamination sheets along the longitudinal axis, the tensioning bolts being inserted in respective tensioning holes, each bolt and hole extending axially between the drive end and the non-drive end.

3. The rotor according to claim 2, wherein the tensioning bolts and holes are provided on the outer side of the rotor body.

4. The rotor according to claim 3, wherein the outer side of the rotor body further comprises a plurality of radial protrusions axially extending between the drive end and the non-drive end, each of the tensioning holes being at least partially housed in one of the radial protrusions.

5. The rotor according to claim 1, wherein the inner side includes a plurality of attaching means for attaching the plurality of permanent magnets to the rotor body.

6. The rotor according to claim 1, wherein the inner side includes a plurality of axial cavities extending between the drive end and the non-drive end for housing the plurality of permanent magnets.

7. The rotor according to claim 1, wherein the rotor body further comprises two annular plates, respectively provided at the drive end and at the non-drive end, wherein one of the two annular plates is a brake disc, the two annular plates being fixed to the plurality of lamination sheets stacked along the longitudinal axis by the plurality of tensioning bolts.

8. The rotor according to claim 1, wherein at least a portion of the plurality of lamination sheets are welded to each other.

9. The rotor according to claim 1, wherein a coating is provided at least over one of the inner side and the outer side.

10. An electrical machine having a stator and a rotor according to claim 1, the electrical machine comprising an air gap interposed between the stator and the inner side of the rotor body.

11. A wind turbine including an electrical machine according to claim 10, the electrical machine being an electrical generator, the drive end of the rotor being connected with a wind rotor of the wind turbine for providing the torque input.

12. A method of manufacturing a rotor for an electrical machine, the rotor extending along a longitudinal axis between a drive end and an axially opposite non-drive end, the drive end being attachable to a torque input, the method comprising:

manufacturing a plurality of permanent magnets;

manufacturing a plurality of lamination sheets, each lamination sheet having a lamination inner border and a lamination outer border;

stacking the plurality of lamination sheets along the longitudinal axis for forming a rotor body extending axially between the drive end and the non-drive and extending in a radial direction orthogonal to the longitudinal axis between an inner side and an outer side, the stacked lamination inner borders forming the inner side and the stacked lamination outer borders forming the outer side;

inserting a plurality of axial strengthening elements in respective axial holes extending across two or more lamination sheets of the plurality of lamination sheets, the plurality of axial strengthening elements comprising pins inserted in respective pin holes, each pin and pin hole extending across two or more lamination sheets of the plurality of lamination sheets; and attaching the plurality of permanent magnets to the inner side of the rotor body.

13. The method according to claim 12, further comprising applying a compression to the plurality of lamination sheets along the longitudinal axis after the stacking.

* * * * *